US010677192B2

(12) United States Patent
Marshall

(10) Patent No.: US 10,677,192 B2
(45) Date of Patent: Jun. 9, 2020

(54) DUAL FUNCTION CASCADE INTEGRATED VARIABLE AREA FAN NOZZLE AND THRUST REVERSER

(71) Applicant: United Technologies Corporation, Farmington, CT (US)

(72) Inventor: Richard M. Marshall, Kirkland (CA)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 249 days.

(21) Appl. No.: 15/674,576

(22) Filed: Aug. 11, 2017

(65) Prior Publication Data

US 2017/0356387 A1  Dec. 14, 2017

Related U.S. Application Data

(63) Continuation of application No. 13/332,529, filed on Dec. 21, 2011, now Pat. No. 9,759,158, which is a continuation-in-part of application No. 12/440,746, filed as application No. PCT/US2006/039990 on Oct. 12, 2006, now Pat. No. 8,104,262.

(51) Int. Cl.
*F02K 1/09* (2006.01)
*F02K 1/42* (2006.01)
*F02K 1/72* (2006.01)

(52) U.S. Cl.
CPC ............. *F02K 1/09* (2013.01); *F02K 1/42* (2013.01); *F02K 1/72* (2013.01); *Y02T 50/671* (2013.01)

(58) Field of Classification Search
CPC ..... F02K 1/70; F02K 1/72; F02K 1/74; F02K 3/04; F02K 3/06; F02K 3/075; F02K 1/08; F02K 1/09
See application file for complete search history.

(56) References Cited

U.S. PATENT DOCUMENTS

| 2,258,792 A | 4/1941 | New |
| 2,865,169 A | 12/1958 | Hausmann |
| 2,936,655 A | 5/1960 | Peterson et al. |
| 3,021,731 A | 2/1962 | Stoeckicht |

(Continued)

FOREIGN PATENT DOCUMENTS

| EP | 0791383 | 8/1997 |
| EP | 1142850 | 10/2001 |

(Continued)

OTHER PUBLICATIONS

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

(Continued)

*Primary Examiner* — Craig Kim
(74) *Attorney, Agent, or Firm* — Carlson, Gaskey & Olds, P.C.

(57) ABSTRACT

A gas turbine engine system according to an exemplary aspect of the present disclosure may include a fan nacelle that extends circumferentially about a fan, and at least one integrated mechanism coupled to the fan nacelle. The at least one integrated mechanism includes a variable fan nozzle and a thrust reverser, with the thrust reverser and the variable fan nozzle having a common part.

30 Claims, 4 Drawing Sheets

(56) References Cited

U.S. PATENT DOCUMENTS

| | | | |
|---|---|---|---|
| 3,194,487 A | 7/1965 | Tyler et al. | |
| 3,262,268 A | 7/1966 | Beavers | |
| 3,287,906 A | 11/1966 | McCormick | |
| 3,352,178 A | 11/1967 | Lindgren et al. | |
| 3,412,560 A | 11/1968 | Gaubatz | |
| 3,747,343 A | 7/1973 | Rosen | |
| 3,754,484 A | 8/1973 | Roberts | |
| 3,779,010 A | 12/1973 | Chamay et al. | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,030,291 A * | 6/1977 | Sargisson | F02K 1/70 239/265.29 |
| 4,130,872 A | 12/1978 | Harloff | |
| 4,284,174 A | 8/1981 | Salvana et al. | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,969,325 A | 11/1990 | Adamson et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,655,360 A * | 8/1997 | Butler | F02K 1/72 239/265.29 |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,148,605 A | 11/2000 | Lardellier | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 7,021,042 B2 | 4/2006 | Law | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,662,059 B2 | 2/2010 | McCune | |
| 7,721,549 B2 | 5/2010 | Baran | |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,997,868 B1 | 8/2011 | Liang et al. | |
| 8,127,529 B2 | 3/2012 | Pero et al. | |
| 8,205,432 B2 | 6/2012 | Sheridan | |
| 2003/0019206 A1* | 1/2003 | Johnson | F02K 1/72 60/204 |
| 2008/0003096 A1 | 1/2008 | Kohli et al. | |
| 2008/0010969 A1* | 1/2008 | Hauer | B64D 29/02 60/204 |
| 2008/0116009 A1 | 5/2008 | Sheridan et al. | |
| 2008/0302907 A1 | 12/2008 | Schafer | |
| 2008/0317588 A1 | 12/2008 | Grabowski et al. | |
| 2009/0056343 A1 | 3/2009 | Suciu et al. | |
| 2009/0245997 A1 | 10/2009 | Hurwitz et al. | |
| 2010/0005777 A1 | 1/2010 | Marshall | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |

FOREIGN PATENT DOCUMENTS

| | | |
|---|---|---|
| GB | 1211923 | 11/1970 |
| GB | 1516041 | 6/1978 |
| GB | 2041090 | 9/1980 |
| GB | 2426792 | 12/2006 |
| JP | 4324149 | 9/2009 |
| JP | 4749119 | 8/2011 |
| RU | 2315887 | 1/2008 |
| WO | 2007038674 | 4/2007 |

OTHER PUBLICATIONS

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T-55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill pp. 87-151.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https:f/www.cgabusinessdesk.com/document/aviation_tech_review.pdf.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation mem-

(56) References Cited

OTHER PUBLICATIONS branes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_pffe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of Textron Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). Ge wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Morton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.

(56) References Cited

OTHER PUBLICATIONS

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMGs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/Sic based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 355-360.

Bunker, R.S. (2005). A review of shaped hole turbine film-cooling technology. Journal of Heat Transfer vol. 127. Apr. 2005. pp. 441-453.

International Search Report and Written Opinion for International Application No. PCT/US2006/039990 completed Jun. 13, 2007.

International Preliminary Report on Patentability dated Mar. 2, 2009.

European Search Report for European Patent Application No. 12195283.2 completed Aug. 25, 2016.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Kiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

(56) References Cited

OTHER PUBLICATIONS

Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, the Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA AMES Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Final Written Decision. U.S. Pat. No. 8,313,280. General Electric Company, *Petitioner*, v. *United Technologies Corporation*, Patent Owner. IPR2017-00427. Entered Jul. 3, 2018.

\* cited by examiner

DUAL FUNCTION CASCADE INTEGRATED VARIABLE AREA FAN NOZZLE AND THRUST REVERSER

CROSS-REFERENCE TO RELATED APPLICATIONS

This application continuation of U.S. application Ser. No. 13/332,529 filed Dec. 21, 2011, which is a continuation-in-part of U.S. application Ser. No. 12/440,746 filed Mar. 11, 2009, which is a National Phase application of PCT/US2006/039990 filed Oct. 12, 2006.

BACKGROUND

This invention relates to gas turbine engines and, more particularly, to a gas turbine engine having a variable fan nozzle integrated with a thrust reverser of the gas turbine engine.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the engine and exits from the engine at an outlet.

Presently, conventional thrust reversers are used to generate a reverse thrust force to slow forward movement of a vehicle, such as an aircraft. One type of conventional thrust reverser utilizes a moveable door stowed near the rear of the nacelle. After touch-down of the aircraft for landing, the door moves into the bypass airflow passage to deflect the bypass airflow radially outwards into cascades, or vents, that direct the discharge airflow in a forward direction to slow the aircraft. Although effective, this and other conventional thrust reversers serve only for thrust reversal and, when in the stowed position for non-landing conditions, do not provide additional functionality. The use of a variable area fan nozzle (VAFN) has been proposed for low pressure ratio fan designs to improve the propulsive efficiency of high bypass ratio gas turbine engines. Integrating the VAFN functionality into a common set of thrust reverser cascades operated by a common actuation system represents a significant reduction in complexity and weight.

SUMMARY

A gas turbine engine system according to an exemplary aspect of the present disclosure may include a core engine defined about an axis, a fan driven by the core engine about the axis to generate bypass flow, and at least one integrated mechanism in communication with the bypass flow. The bypass flow defines a bypass ratio greater than about six (6). The at least one integrated mechanism includes a variable area fan nozzle (VAFN) and thrust reverser, and a plurality of positions to control bypass flow.

In a further non-limiting embodiment of any of the foregoing gas turbine engine system embodiments, the bypass flow is arranged to communicate with an exterior environment when the integrated mechanism is in a deployed position.

In a further non-limiting embodiment of any of the foregoing gas turbine engine system embodiments, the integrated mechanism includes a plurality of apertures to enable the communication of the bypass flow with the exterior environment when the integrated mechanism is in the deployed position.

In a further non-limiting embodiment of any of the foregoing gas turbine engine system embodiments, the integrated mechanism includes a single actuator set to move between the plurality of positions.

In a further non-limiting embodiment of any of the foregoing gas turbine engine system embodiments, the thrust reverser has a stowed position and a deployed position to divert the bypass flow in a thrust reversing direction.

In a further non-limiting embodiment of any of the foregoing gas turbine engine system embodiments, a gear system is driven by the core engine. The fan is driven by the gear system. The gear system defines a gear reduction ratio of greater than about 2.3.

In a further non-limiting embodiment of any of the foregoing gas turbine engine system embodiments, a gear system is driven by the core engine. The fan is driven by the gear system. The gear system defines a gear reduction ratio of greater than 2.5.

In a further non-limiting embodiment of any of the foregoing gas turbine engine system embodiments, the core engine includes a low pressure turbine which defines a pressure ratio that is greater than about five (5).

In a further non-limiting embodiment of any of the foregoing gas turbine engine system embodiments, the core engine includes a low pressure turbine which defines a pressure ratio that is greater than five (5).

In a further non-limiting embodiment of any of the foregoing gas turbine engine system embodiments, the at least one integrated mechanism is arranged to change a pressure ratio across the fan.

In a further non-limiting embodiment of any of the foregoing gas turbine engine system embodiments, the bypass ratio is greater than about 10.

In a further non-limiting embodiment of any of the foregoing gas turbine engine system embodiments, the bypass ratio is greater than 10.

In a further non-limiting embodiment of any of the foregoing gas turbine engine system embodiments, a gear system is driven by the core engine. The fan is driven by the gear system with a gear reduction ratio greater than 2.5. The gear system is an epicycle gear train. The core engine includes a low pressure turbine which defines a pressure ratio that is greater than five (5).

A gas turbine engine according to another exemplary aspect of the present disclosure may include a core engine defined about an axis, a fan couple to be driven by said core engine about the axis to generate a bypass flow, and at least one integrated mechanism in communication with the bypass flow. The core engine includes at least a low pressure turbine which defines a pressure ratio that is greater than about five (5). The at least one integrated mechanism includes a variable area fan nozzle (VAFN) and a thrust reverser. The integrated mechanism also may includes a plurality of positions to control bypass flow. The integrated mechanism includes a section common to the thrust reverser and VAFN.

In a further non-limiting embodiment of any of the foregoing gas turbine engine embodiments, the integrated mechanism includes at least one actuator set to move between the plurality of positions.

In a further non-limiting embodiment of any of the foregoing gas turbine engine embodiments, the thrust reverser has a stowed position and a deployed position to divert the bypass flow in a thrust reversing direction.

In a further non-limiting embodiment of any of the foregoing gas turbine engine embodiments, the common section is moveable between a plurality of axial positions and has a plurality of apertures providing a flow path for the bypass flow to reach an exterior environment of the gas turbine engine.

In a further non-limiting embodiment of any of the foregoing gas turbine engine embodiments, a gear system is included. The core engine drives the fan via the gear system, which defines a gear reduction ratio of greater than about 2.3.

In a further non-limiting embodiment of any of the foregoing gas turbine engine embodiments, a gear system is included. The core engine drives the fan via the gear system, which defines a gear reduction ratio of greater than 2.5.

In a further non-limiting embodiment of any of the foregoing gas turbine engine embodiments, the bypass flow defines a bypass ratio greater than about ten (10).

In a further non-limiting embodiment of any of the foregoing gas turbine engine embodiments, the bypass flow defines a bypass ratio greater than ten (10).

In a further non-limiting embodiment of any of the foregoing gas turbine engine embodiments, the thrust reverser includes a blocker door moveable between a stowed position and a deployed position and a link having one end connected to the blocker door and an opposite end connected to a support.

In a further non-limiting embodiment of any of the foregoing gas turbine engine embodiments, the blocker door includes a slot having a T-shaped cross section, the slot slidably receiving the link.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
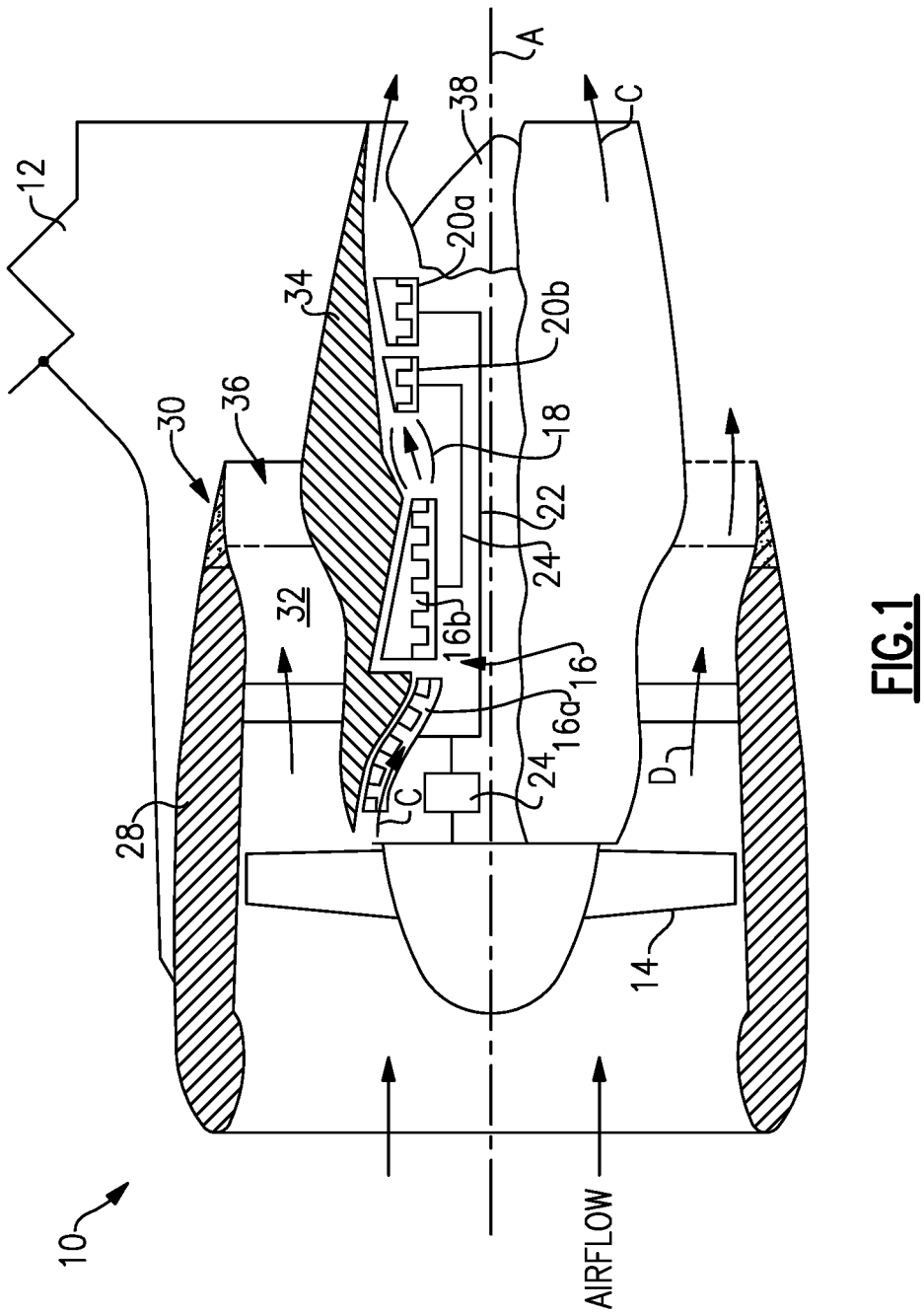
FIG. 1 illustrates selected portions of an example gas turbine engine system having a mechanism that integrates a variable fan nozzle integrated and a thrust reverser.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22 and 24 (e.g., spools) to rotationally drive the compressors 16a, 16b and the fan 14 in response to the expansion. In this example, the rotor 22 also drives the fan 14 through a gear train 24.

The engine 10 is preferably a high-bypass geared architecture aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and the low pressure turbine 18 has a pressure ratio that is greater than about 5. In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 24 is an epicycle gear train, for example, a star gear train, providing a gear reduction ratio of greater than 2.5. It should be understood, however, that the above parameters are only exemplary of a contemplated geared turbofan engine. That is, the invention is applicable to other engines.

An outer housing, nacelle 28, (also commonly referred to as a fan nacelle) extends circumferentially about the fan 14. A fan bypass passage 32 extends between the nacelle 28 and an inner housing, inner cowl 34, which generally surrounds the compressors 16a, 16b and turbines 20a, 20b. In this example, the gas turbine engine 10 includes integrated mechanisms 30 that are coupled to the nacelle 28. The integrated mechanisms 30 integrate functions of a variable fan nozzle and a thrust reverser, as will be described below. Any number of integrated mechanisms 30 may be used to meet the particular needs of an engine. In this example, two integrated mechanisms 30 are used, one on each semicircular half of the nacelle 28.

In operation, the fan 14 draws air into the gas turbine engine 10 as a core flow, C, and into the bypass passage 32 as a bypass air flow, D. The bypass air flow D is discharged as a discharge flow through a rear exhaust 36 associated with the integrated mechanism 30 near the rear of the nacelle 28 in this example. The core flow C is discharged from a passage between the inner cowl 34 and a tail cone 38.

For the gas turbine engine 10 shown FIG. 1, a significant amount of thrust may be provided by the discharge flow due to the high bypass ratio. Thrust is a function of density, velocity, and area. One or more of these parameters can be manipulated to vary the amount and direction of thrust provided or to enhance conditions for aircraft control, operation of the fan 14, operation of other components associated with the bypass passage 32, or operation of the gas turbine engine 10. For example, an effective reduction in area of the rear exhaust 36 causes an air pressure increase within the bypass passage 32 that in turn changes a pressure ratio across the fan 14.

In the disclosed example, the integrated mechanism 30 includes a structure associated with the rear exhaust 36 to change one or more of these parameters. However, it should be understood that the bypass flow or discharge flow may be effectively altered by other than structural changes, for example, by altering a flow boundary layer. Furthermore, it should be understood that effectively altering a cross-sectional area of the rear exhaust 36 is not limited to physical locations approximate to the exit of the nacelle 28, but rather, includes altering the bypass flow D by any suitable means.

Figure 2:
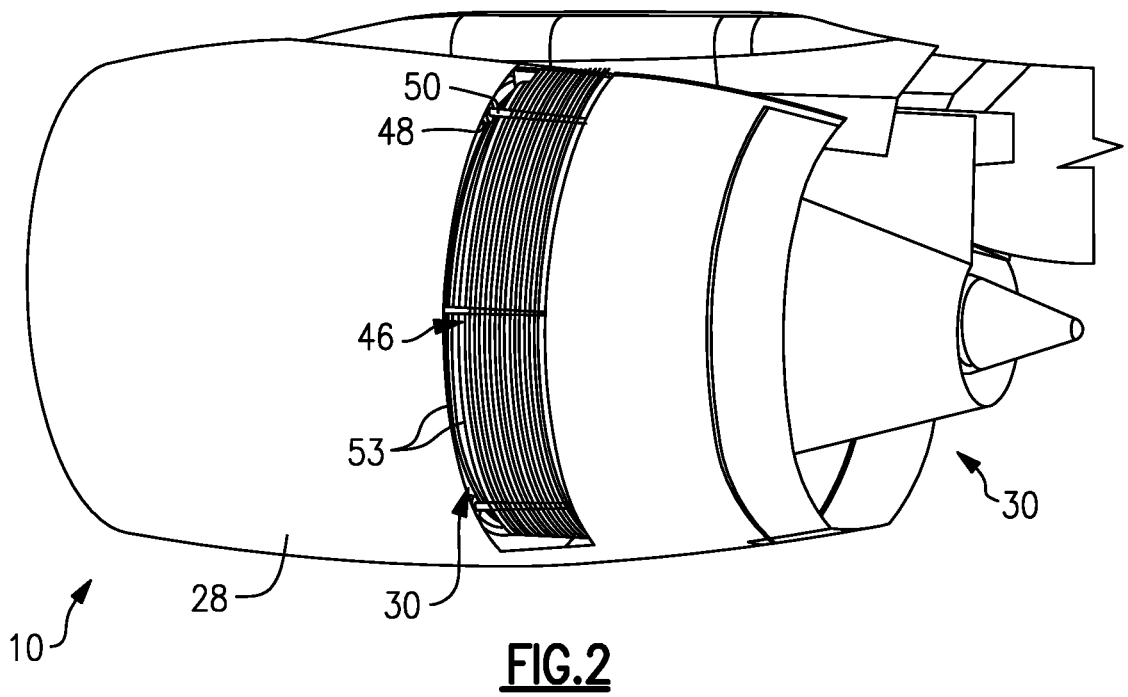
FIG. 2 illustrates a perspective view of the example gas turbine engine system with cascades exposed for thrust reversal.
Figure 3A:
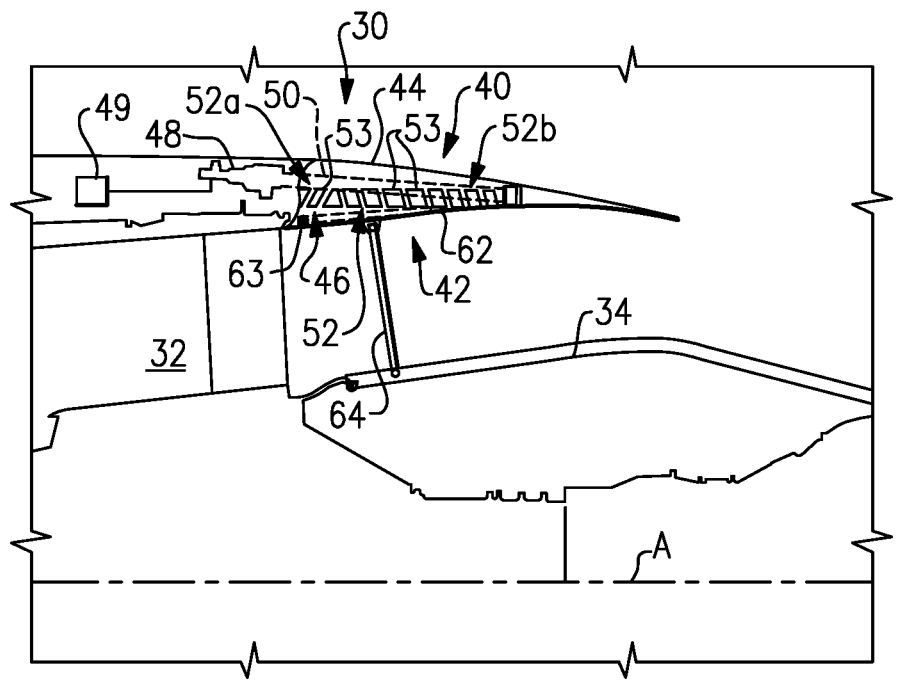
FIG. 3A illustrates a schematic view of the mechanism having an axially moveable section that is in a closed position.

Referring to FIGS. 2 and 3A, the integrated mechanism 30 in this example includes a nozzle 40 and a thrust reverser 42. The nozzle 40 and thrust reverser include a common part, section 44, which is moveable between a plurality of axial positions relative to the centerline axis A. In this example, the section 44 is a hollow sleeve-like structure that extends about a cascade section 46. Actuators 48 are mounted within the nacelle 28 in this example. Links 50 extend through the cascade section 46 and are coupled on one end with the respective actuators 48 and on an opposite end with the section 44 in a known manner A controller 49 communicates with the actuators 48 to selectively axially move the section 44. The controller 49 may be dedicated to controlling the integrated mechanism 30, integrated into an existing engine controller within the gas turbine engine 10, or be incorporated with other known aircraft or engine controls. Alternatively, one or more of the actuators 48 are mounted within the cascade section 46 in a known manner In the disclosed example, the cascade section 46 includes a plurality of apertures 52, or vents, that provide a flow path between the bypass passage 32 and the exterior environment of the gas turbine engine 10. The apertures 52 may be formed in any known suitable shape, such as with airfoil shaped vanes 53 between the apertures 52. In this example, the apertures 52 are arranged in circumferential rows about the cascade section 46. A first set of apertures 52a near the forward end of the cascade section 46 are angled aft and a second set of apertures 52b aft of the first set of apertures 52a are angled forward. Axial movement of the section 44 selectively opens, or exposes, the apertures 52a, apertures 52b, or both to provide an auxiliary passage for the discharge flow, as will be described below.

In the illustrated example, there are two circumferential rows in the first set of apertures 52a and a larger number of circumferential rows in the second set of apertures 52b. In one example, two circumferential rows in the first set of apertures 52a is adequate for altering the discharge flow, as will be described. However, it is to be understood that one circumferential row or greater than two circumferential rows may be used for smaller or larger alterations, respectively.

Figure 3B:
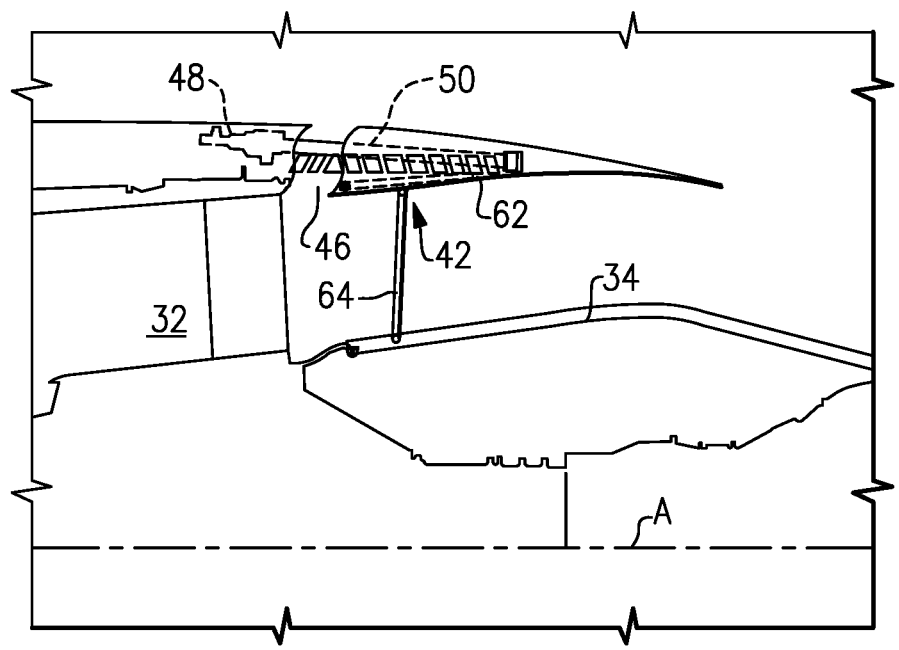
FIG. 3B illustrates a schematic view of the axially moveable section in an intermediate position for altering a discharge flow from the gas turbine engine.
Figure 3C:
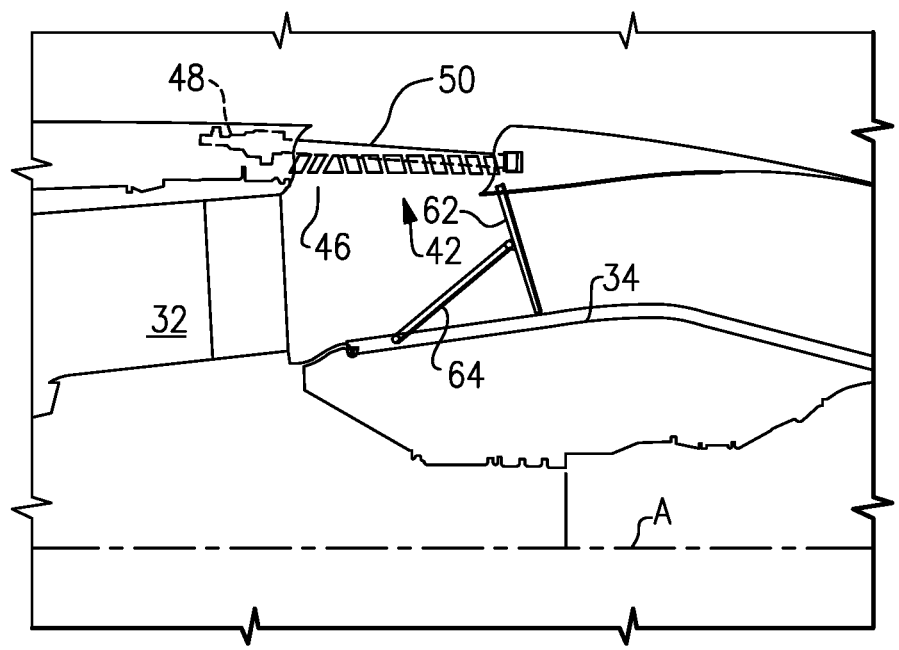
FIG. 3C illustrates a schematic view of the axially moveable section in an open position for generating a thrust reversing force.

The thrust reverser 42 includes a blocker door 62 having a stowed position (FIG. 3A) and a fully deployed position (FIG. 3C). The blocker door 62 is pivotally connected to the section 44 at connection 63. A drag link 64 includes one end that is slidably connected to the blocker door 62 and an opposite end that is connected to a support, the inner cowl 34 in this example. Although only one drag link 64 is shown, it is to be understood that any suitable number of drag links 64 may be used.

Figure 4:
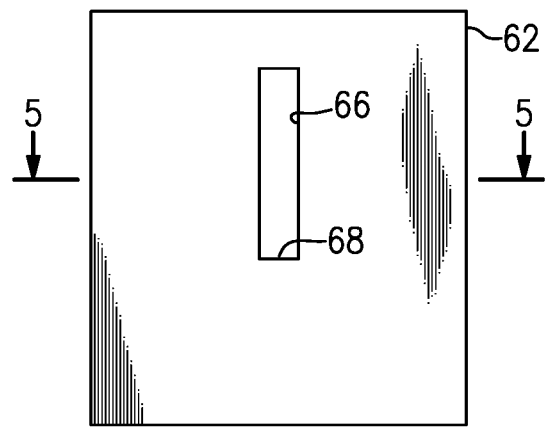
FIG. 4 illustrates a blocker door of the thrust reverser.
Figure 5:
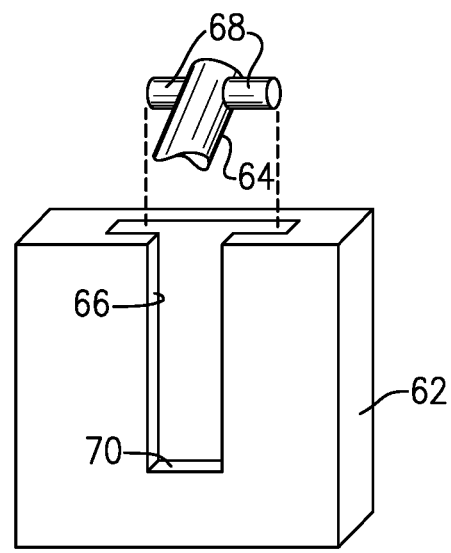
FIG. 5 illustrates a view of an example slot of the blocker door according to the section shown in FIG. 4.

Referring to FIGS. 4 and 5, the blocker door 62 includes a slot 66 for slidably connecting the drag link 64 to the blocker door 62. In this example, the shape of the slot 66 is adapted to receive and retain the end of the drag link 64. For example, the slot 66 is T-shaped and the end of drag link 64 includes laterally extending slide members 68, such as rollers, bearings, friction material, or other known suitable mechanism for allowing the end of the drag link 64 to slide along the slot 66. Given this description, one of ordinary skill in the art will recognize alternative suitable slot shapes or sliding connections to meet their particular needs.

In operation, the controller 49 selectively commands the actuators 48 to move the section 44 between the plurality of axial positions to alter the discharge flow or provide thrust reversal. FIG. 3A illustrates the section 44 in a first axial position (i.e., a closed position) sealed against the nacelle 28. In the closed position, the section 44 completely covers the cascade section 46 such that the discharge flow exits axially through the rear exhaust 36.

FIG. 3B illustrates the section 44 in a second axial position spaced apart from the nacelle 28 to provide an opening there between and expose a portion of the cascade section 46. In the second position, the first set of apertures 52a are exposed to provide an auxiliary passage for the discharge flow. The auxiliary passage provides an additional passage (i.e., additional effective cross-sectional flow area) for exit of the discharge flow from the bypass passage 32 to thereby alter the discharge flow. A portion of the discharge flow flows through the first set of apertures 52a and is directed in the aft direction. Although the aft angle in the illustrated example is not parallel to the centerline axis A, a geometric component of the aft angle is parallel. The geometric component of the discharge flow that is parallel to the centerline axis A provides the benefit of maintaining a portion of the thrust generated by the discharge flow.

Upon movement of the section 44 between the first position and the second position, the blocker door 62 remains in the stowed position. The connection between the drag link 64 and the slot 66 provides a range of lost motion movement. That is, the movement of the section 44 causes the drag link 64 to slide along the slot 66 of the blocker door 62 without moving the blocker door 62 into the deployed position.

FIG. 3C illustrates the section 44 in a third axial position (i.e., a thrust reverse position). Movement of the section 44 beyond the second position toward the third position causes the end of the drag link 64 to engage an end 70 of the slot 66. Once engaged, the drag link 64 pivots the blocker door 62 about the connection 63 and into the bypass passage 32. The blocker door 62 deflects the discharge flow radially outwards relative to the centerline axis A toward the cascade section 46. The movement of the section 44 to the third position also exposes the apertures 52b. The deflected discharge flow enters the second set of apertures 52b, which angle the discharge flow in the forward direction to generate a reverse thrust force.

In this example, there are more apertures 52 within the first set of apertures 52b than in the second set of apertures 52a. Thus, the reverse thrust force due to discharge flow through the second set of apertures 52b overcomes any thrust due to aft discharge flow from the apertures 52a.

The disclosed example integrated mechanism 30 thereby integrates the function of altering the discharge flow with the thrust reversing function. The integrated mechanism 30 utilizes a single set or system of actuators 48 to eliminate the need for separate actuators or sets of actuators for altering the discharge flow and deploying the thrust reverser. Using a single actuator or set of actuators 48 as in the disclosed examples eliminates at least some of the actuators that would otherwise be used, thereby reducing the weight of the gas turbine engine 10 and increasing the fuel efficiency.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a fan nacelle that extends circumferentially about a fan;
   a bypass ratio of greater than 10;

a low pressure compressor and a high pressure compressor;
a gear train driving the fan, the gear train having a gear reduction ratio of greater than 2.5;
a combustion section in communication with the low pressure compressor and the high pressure compressor;
a low pressure turbine and a high pressure turbine, the low pressure turbine having a pressure ratio of greater than 5, with the low pressure turbine and high pressure turbine coupled for rotation with respective spools to rotationally drive the low pressure compressor, the high pressure compressor and the gear train, and the fan driven through the gear train;
at least one integrated mechanism coupled to the fan nacelle, the at least one integrated mechanism including a variable fan nozzle and a thrust reverser, the thrust reverser and the variable fan nozzle having a common part;
at least one actuator coupled to the at least one integrated mechanism; and
a controller that communicates with the at least one actuator in operation to selectively move the at least one integrated mechanism.

2. The gas turbine engine of claim 1, wherein the at least one integrated mechanism includes at least two integrated mechanisms.

3. The gas turbine engine of claim 2, wherein each of the two integrated mechanisms is coupled to a respective semicircular portion of the fan nacelle.

4. The gas turbine engine of claim 3, wherein the thrust reverser includes a blocker door having a stowed position and a fully deployed position.

5. The gas turbine engine of claim 4, wherein the blocker door is pivotably connected to the common part.

6. The gas turbine engine of claim 5, further comprising a link including a first portion slideably connected to the blocker door and a second portion connected to a support.

7. The gas turbine engine of claim 6, wherein the support is an inner cowl, and the link is non-slideably connected to the inner cowl.

8. The gas turbine engine of claim 6, wherein the blocker door includes a slot that receives and retains the first portion of the link.

9. The gas turbine engine of claim 8, wherein the slot has a t-shaped cross section.

10. The gas turbine engine of claim 1, wherein the engine has an engine control, and the controller is integrated with the engine control.

11. The gas turbine engine of claim 10, wherein the controller communicates with the at least one actuator to selectively axially move the common part.

12. The gas turbine engine of claim 1, wherein the thrust reverser includes a cascade section, the cascade section including a first set of apertures angled in a first direction and a second set of apertures angled in a second, different direction.

13. The gas turbine engine of claim 12, wherein the first direction is a forward direction, and the second direction is an aft direction.

14. The gas turbine engine of claim 13, wherein the first set of apertures and the second set of apertures are arranged in circumferential rows about the cascade section such that there are a larger number of circumferential rows in the second set of apertures than in the first set of apertures.

15. The gas turbine engine of claim 14, wherein the first set of apertures are arranged in two circumferential rows.

16. The gas turbine engine of claim 15, further comprising airfoil shaped vanes between the apertures.

17. A gas turbine engine comprising:
a fan nacelle that extends circumferentially about a fan, with a bypass passage extending between the fan nacelle and an inner housing;
a bypass ratio of greater than 10;
a low pressure compressor and a high pressure compressor;
a gear train defining a gear reduction ratio of greater than 2.5;
a combustion section in communication with the low pressure compressor and the high pressure compressor;
a low pressure turbine and a high pressure turbine, the low pressure turbine having a pressure ratio of greater than 5, with the low pressure turbine and the high pressure turbine coupled for rotation with respective spools to rotationally drive the low pressure compressor, the high pressure compressor and the gear train, and the fan driven through the gear train;
at least one integrated mechanism coupled to the fan nacelle, the at least one integrated mechanism including a variable area nozzle and a thrust reverser, the thrust reverser and the variable area nozzle having a common part; and
a plurality of actuators coupled to the at least one integrated mechanism, each one of the plurality of actuators moving both the variable area nozzle and the thrust reverser in operation.

18. The gas turbine engine of claim 17, further comprising a controller, the controller communicating with the plurality of actuators to selectively move the common part between a plurality of axial positions in operation with respect to a centerline axis of the engine.

19. The gas turbine engine of claim 18, wherein the thrust reverser includes a cascade section, the cascade section including a first set of apertures angled to discharge airflow in a forward direction and a second set of apertures angled to discharge airflow in an aft direction with respect to the centerline axis of the engine.

20. The gas turbine engine of claim 19, wherein the first set of apertures and the second set of apertures are arranged in circumferential rows about the cascade section such that there are a larger number of circumferential rows in the second set of apertures than in the first set of apertures, and the first set of apertures are arranged in two or more circumferential rows.

21. The gas turbine engine of claim 19, wherein:
the common part includes a hollow sleeve that extends about the cascade section;
the second set of apertures are axially aft of the first set of apertures with respect to the centerline axis of the engine;
the plurality of axial positions include a stowed position, an intermediation position, and a deployed position;
the first set of apertures are exposed in the intermediate position and the deployed position, but not the stowed position; and
the second set of apertures are exposed in the deployed position, but not in the stowed or intermediate positions.

22. The gas turbine engine of claim 21, wherein:
the thrust reverser includes a blocker door pivotably connected to the common part; and
the blocker door is pivotable into the bypass passage when in the thrust reverser is in the deployed position, but not in the stowed or intermediate positions.

23. A gas turbine engine comprising:
a fan nacelle that extends circumferentially about a fan, with a bypass passage extending between the fan nacelle and an inner housing;
a bypass ratio greater than 10;
a low pressure compressor and a high pressure compressor;
a gear train defining a gear reduction ratio of greater than 2.5;
a combustion section in communication with the low pressure compressor and the high pressure compressor;
a low pressure turbine and a high pressure turbine, the low pressure turbine having a pressure ratio of greater than 5, with the low and high pressure turbines coupled for rotation with respective spools to rotationally drive the low pressure compressor, the high pressure compressor and the gear train, and the fan driven through the gear train;
at least one integrated mechanism coupled to the fan nacelle, the at least one integrated mechanism including a variable area nozzle and a thrust reverser, the thrust reverser and the variable area nozzle having a common part; and
wherein the common part is movingly connected to at least one actuator and a controller than selectively moves the at least one integrated mechanism in operation, including actuating the variable area nozzle and enhancing operation of the fan.

24. The gas turbine engine of claim 23, comprising a link including a first portion and a second portion, wherein the thrust reverser includes a blocker door pivotably connected to the common part, the blocker door receives and retains the first portion of the link, and the second portion of the link is non-slideably connected to an inner cowl.

25. The gas turbine engine of claim 24, wherein the engine has an engine control, and the controller is integrated with the engine control and communicates with the at least one actuator to selectively axially move the common part.

26. A method of controlling a gas turbine engine comprising:
providing a fan nacelle that extends circumferentially about a fan;
a bypass ratio of greater than 10;
providing at least one integrated mechanism coupled to the fan nacelle, the at least one integrated mechanism including a variable area nozzle and a thrust reverser, the thrust reverser and the variable area nozzle having a common part;
rotationally driving a low pressure compressor coupled to a low pressure turbine, the low pressure turbine having a pressure ratio of greater than 5;
rotationally driving the fan through a gear train coupled to the low pressure turbine, the gear train having a gear reduction ratio of greater than 2.5; and
moving the common part between a stowed position and an intermediate position to direct discharge flow in an aft direction and enhancing operation of the fan.

27. The method of claim 26, wherein:
the thrust reverser includes a cascade section having a first set of apertures angled in a first direction and a second set of apertures angled in a second, different direction;
the common part seals against the fan nacelle in the stowed position and completely covers the cascade section such that bypass flow exits axially through a rear exhaust; and
the common part is spaced apart from the fan nacelle in the intermediate position to provide an auxiliary passage and expose the first set of apertures, but does not expose the second set of apertures in the intermediate position.

28. The method of claim 27, further comprising moving the common part between the intermediate position and a deployed position exposing the second set of apertures, and directing discharge flow in a forward direction, generating a reverse thrust force.

29. The method of claim 28, further comprising pivoting a blocker door into a bypass passage when in the thrust reverser is in the deployed position, but not in the intermediate position, to deflect discharge flow from the bypass passage radially outwards through the auxiliary passage.

30. The method of claim 29, wherein the first set of apertures and the second set of apertures are arranged in circumferential rows about the cascade section such that there are a larger number of circumferential rows in the second set of apertures than in the first set of apertures, and such that reverse thrust force due to directing discharge flow through the second set of apertures overcomes any thrust force due to directing discharge flow from the first set of apertures.

* * * * *